Feb. 10, 1959 R. SCHLEI 2,873,386
PROCESS AND DEVICE FOR GENERATING ELECTRICAL PULSE GROUPS
Filed Oct. 10, 1955
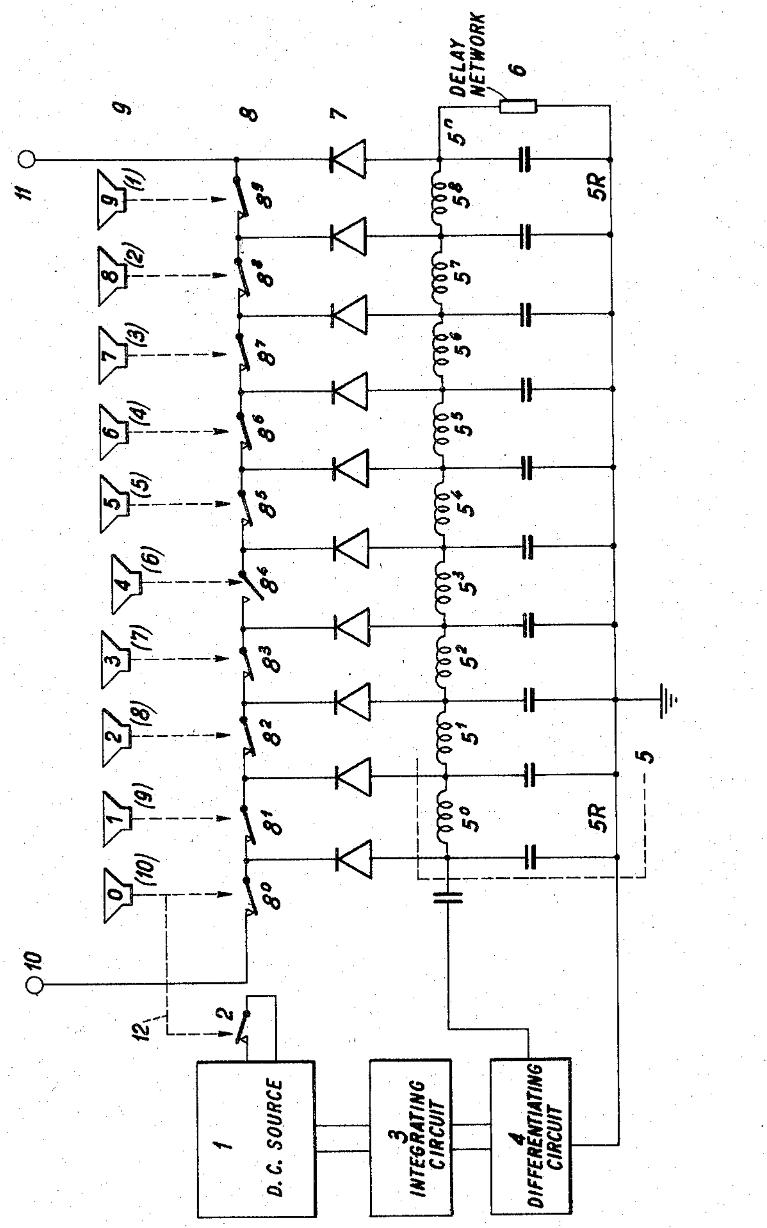
INVENTOR
Rudolf Schlei United States Patent Office 2,873,386
Patented Feb. 10, 1959

2,873,386

PROCESS AND DEVICE FOR GENERATING ELECTRICAL PULSE GROUPS

Rudolf Schlei, Berlin-Lichterfelde-Ost, Germany, assignor to Kienzle Apparate G. m. b. H., Villingen, Black Forest, Germany Application October 10, 1955, Serial No. 539,637

Claims priority, application Germany October 11, 1954

7 Claims. (Cl. 307—88.5)

The present invention relates to a method and a device for generating a series of electrical pulses with a selectable number of single pulses or for the generation of a multiple of a pulse series. Such series are needed in electronic computers for the control of television image selection in the production of TV trick films and the like for the required switching and control operations.

Up to the present it has been known to select different pulse series from a given pulse series which is, e. g., supplied by a pulse generator. In this process, a series of pulses passes one or several gates as many times as desired, the gates being opened and closed by independent current pulses at time intervals spaced to permit passage of the desired pulse series through the gates. In this manner it is possible to generate the desired pulse series, or the multiple thereof, from a given pulse series.

It is the object of the present invention to generate the desired pulse series or the multiples thereof directly, without selection, from a given pulse series in an especially simple manner.

The invention is based on the fact that a pulse, which is fed to a time delay network or to another delay line, leaves the line with a time lag depending on the line characteristics and the distance from the input. Up to the present, this fact has been used only for storing pulses or pulse series for any desired length of time. For that purpose, a pulse at the output may be fed to the input so that the pulse or pulses circulating in a closed circuit comprising a time delay network or other delay line and a return line, are, if necessary after correction, stored and can be withdrawn at the input or output of the circuit.

It has now been found that such an arrangement affords the possibility of generating selectable pulse series or a multiple thereof from given single pulses or pulse series, directly and without expensive detours susceptible to disturbances.

According to the invention, one or several single pulses are fed to a circuit comprising a time delay circuit, are taken off the circuit at pre-arranged points and led over decoupling circuits with practically zero feed back to a line introducing none or only a short time lag. This last line can be opened between any two adjacent coupling circuits. The pulse series, determined by the point at which the last line has been opened, may then be obtained at the terminals of this line.

According to the invention, the arrangement for carrying out the method comprises a delay circuit connected to a pulse generator; also it comprises an output line introducing no time lag or only a short time lag and having a plurality of normally closed switches. A plurality of branch lines connects preferably electrically spaced points on the delay circuit to the terminals as well as to points between adjacent switches on the output line. Finally, the system contains decoupling elements, such as diodes, high resistances, or the like, in each branch line.

The number of pulses in a pulse series depends on which of the selectively operable switches is actuated and from which terminal of the output line the pulses are taken. Depending further on whether a single pulse or several pulses are admitted to the system, a pulse series or a multiple thereof is obtained at the terminals of the output line. In any case, a single initial pulse generates a pulse series of desired shape and number; a plurality of initial pulses from which the desired pulse series is selected is not necessary.

The time delay circuit may be continuous, such as a line with a uniformly distributed inductance and/or capacitance. Preferably, it is a time delay network with inductance-capacitance, resistance-capacitance, and inductance-resistance stages or a glow discharge tube circuit. It is advantageous to select large values of inductance and capacitance to obtain long time delays. Rods of ferrite may for instance be used or a staked series of ferrite rings, on which are provided coils and/or capacitors with high dielectric losses; this, of course, has to be in keeping with the steep slope of the pulses which is determined by the highest frequency transmitted. The transmission of the total frequency band up to the highest frequency is also important for the selection of the magnetic and the dielectric materials, whose electrical properties, permeability, and dielectric constant, respectively, cannot be increased as desired, and which determine the inherent highest frequency of the materials to be used.

For the proper functioning of the system it is very important that the pulses transmitted to the output line, which introduces only a negligible time lag, should be without effect on the delay line with the time lag. For this purpose, I provide the above-mentioned decoupling elements, such as diodes, rectifiers, or high ohmic resistances, and the like.

The pulse generator may either contain a mechanical or an electronic switching device operated by hand or electrically; it may consist of any desired voltage supply, preferably a direct current supply, which supplies one or several current pulses to the delay circuit.

In order to generate well defined pulse shapes, the switching devices are as free of recoil as possible; they may for instance be devices similar to Morse keys, or they may be push-buttons. For the purpose of eliminating deviations from the desired pulse shape (steep slopes) caused by transients, due to unavoidable recoils, I arrange pulse-shaping circuits, e. g., integrating elements and, if necessary, differentiating elements in the system.

The system according to the invention is very well adapted for designating successive numerals, e. g. in computers. When the system is used for that purpose, the selective switches provided in the output line are actuated by successively numbered keys. These numbers indicate the number of pulses generated at the terminals of the second line or the complementary values thereof.

The invention will now be more fully described with reference to the accompanying drawing which illustrates in diagrammatic form one embodiment of the invention; it should, however, be understood that many changes in the details can be made without departing from the spirit of the invention.

Referring to the drawing, the system is shown to comprise a pulse generator which includes a D. C. source 1 and a recoil-free switch 2. Connected thereto is an integrating circuit 3, a differentiating circuit 4, and a time delay network 5, which consists of coils and capacitors and which has branch points $5^R$ between adjacent stages of the capacitance-inductance network.

At the terminals and between adjacent sections of the capacitance-inductance network, decoupling diodes 7 connect to the branch points $5^0$, $5^1$, $5^2$ . . . $5^n$, in parallel to an output line 8 introducing no time lag; between the connecting points the output line 8 contains switches $8^1$, $8^2$, $8^3$ . . . $8^n$. The diodes 7 are connected to the terminals and to points between the switches $8^1$ . . . $8^n$. The decoupling diodes 7, which are so directed that they block the return path of the pulses from the output line 8 to the line delay network 6, may, of course, be replaced by some other passive or active decoupling element. It is only necessary that they have a sufficiently high resistance compared to the resistance of the delay line to sufficiently reduce feed back.

The switches $8^0$, $8^1$, $8^2$ . . . $8^n$, of which only one is preferably opened at a time, may be actuated before or simultaneously with switch 2 for the generation of the desired pulse series. Thus, as can easily be seen, two separate pulse series are obtained, one on each side of the opened switch $8^1$, $8^2$ . . . or $8^n$, on the output line 8, the number of pulses in each series depending on the number of branches connected thereto and on the selection of one of the switches $8^1$ . . . or $8^n$.

When, as illustrated in the embodiment shown, keys 9, used for actuating switches 8 and arranged on a keyboard, are marked with numerals in consecutive order, it follows that upon opening of a single switch 8, a pulse series with a number of pulses equal to the key numeral is available at one terminal of the output line 8, while a pulse series with a number of pulses equal to the complementary value of the said number is available at the other output line terminal.

If, instead of one pulse, several pulses are supplied to the delay network by switch 2, the multiple corresponding to the number of pulses will be obtained. It is imperative that the pulses have a convenient shape and a steep slope, particularly when the time delay circuit has a small time lag.

In order to shape the pulses generated by switch 2, furthermore, in order to suppress the transients due to contact recoil, if any, and finally in order to smooth current fluctuations over the width of the pulse, which are caused by variations in the contact resistance of switch 2, I have provided the above mentioned integrating circuit 3 and differentiating circuit 4 preceding the time delay circuit.

As shown by dotted line 12, switch 2 can be actuated simultaneously by any of keys 9. There may, however, be independent actuating means for this switch or it may be actuated in dependence thereon, and if so, the switch 2 should be closed after keys 9 are opened. In that case it is necessary to provide switches $8^0$, $8^1$, $8^2$ . . . $8^n$, or their keys respectively, with a delayed action device, the delay corresponding to the time necessary for operating switch 2. It is possible to provide an auxiliary device operating automatically or being operated by hand, when necessary, which device causes switch 2 to generate one or several pulses, as selected.

The pulse series derived at the terminals 10, 11 of output 8 may be fed, directly or by means of appropriate amplifying stages, to other switch-or control elements, more particularly to counters, storing devices, and the like.

What I claim is:

1. Apparatus for the generation of pulse series containing a desired number of pulses or a multiple of such series comprising a pulse generator, a time delay circuit, said time delay circuit being fed by said pulse generator, a plurality of decoupling circuits, a unilateral element contained in each of said decoupling circuits, each decoupling circuit having two terminals, one terminal of each of said decoupling circuits being connected to electrically spaced points on said time delay circuit, an output line introducing substantially no time lag, the other terminal of said decoupling circuits being connected to said output line, a plurality of normally closed switching means arranged on said output line, each one of said switching means being arranged between each two of said other terminals of said decoupling circuits, and being adapted to divide said output line into separate portions when being operated.

2. Apparatus as claimed in claim 1, in which said unilateral elements arranged in said decoupling circuits are diodes.

3. Apparatus as claimed in claim 1, in which said unilateral elements arranged in said decoupling circuits are resistors, which are high-ohmic in proportion to the surge resistance of said time delay circuit.

4. Apparatus as claimed in claim 1, in which said first terminals of said decoupling circuits are connected to said time delay circuit at electrically equidistant points.

5. Apparatus for the generation of pulse series containing a desired number of pulses or a multiple of such series comprising a pulse generator, a time delay circuit, said time delay circuit being fed by said pulse generator, a plurality of decoupling circuits, a unilateral element contained in each of said decoupling circuits, each decoupling circuit having two terminals, one terminal of each of said decoupling circuits being connected to electrically spaced points on said time delay circuit, an output line introducing substantially no time lag, the other terminal of said decoupling circuits being connected to said output line, a plurality of normally closed switching means arranged on said output line, each one of said switching means being arranged between each pair of said other terminals of said decoupling circuits, a plurality of numbered keys, each one adapted to open one of said switching means on said output line.

6. Apparatus for the generation of pulse series containing a desired number of pulses or a multiple of such series comprising a pulse generator, switching means to operate said pulse generator, a time delay circuit, said time delay circuit being fed by said pulse generator, a plurality of decoupling circuits, a unilateral element contained in each of said decoupling circuits, each decoupling circuit having two terminals, one terminal of each of said decoupling circuits, being connected to electrically spaced points on said time delay circuit, an output line introducing substantially no time lag, the other terminal of said decoupling circuits being connected to said output line, a plurality of normally closed switching means arranged on said output line, each one of said switching means being arranged between each two of said other terminals of said decoupling circuits, a plurality of numbered keys, each one adapted to open one of said normally closed switching means on said output line, each of said numbered keys being adapted to simultaneously operate said switching means for operating said pulse generator.

7. Apparatus for the generation of pulse series containing a desired number of pulses or a multiple of such series comprising a pulse generator, a time delay circuit, said time delay circuit being fed by said pulse generator, a plurality of decoupling circuits, a unilateral element contained in each of said decoupling circuits, each decoupling circuit having two terminals, one terminal of each of said decoupling circuits being connected to electrically spaced points on said time delay circuit, an output line introducing substantially no time lag, the other terminal of said decoupling circuits being connected to said output line, a plurality of normally closed switching means arranged on said output line, each one of said switching means being arranged between each two of said other terminals of said decoupling circuits, said output line having two terminals, one of said terminals being adapted to take off said pulse series with said number of desired pulses, said other terminal being adapted to take off a pulse series with a number of pulses complementary to the desired number of pulses.

References Cited in the file of this patent

UNITED STATES PATENTS

| | | |
|---|---|---|
| 1,163,346 | Johnson | Dec. 7, 1915 |
| 2,521,952 | Stephenson | Sept. 12, 1950 |
| 2,565,231 | Hepp | Aug. 21, 1951 |
| 2,587,741 | Libois | Mar. 4, 1952 |
| 2,589,254 | Hoeppner | Mar. 18, 1952 |
| 2,611,094 | Rex | Sept. 16, 1952 |
| 2,616,965 | Hoeppner | Nov. 4, 1952 |
| 2,644,130 | Summers | June 30, 1952 |
| 2,662,977 | De Rosa | Dec. 15, 1953 |
| 2,743,367 | Felch et al. | Apr. 24, 1956 |
| 2,764,678 | Craib | Sept. 25, 1956 |